United States Patent [19]

Hess

[11] Patent Number: 4,586,184

[45] Date of Patent: Apr. 29, 1986

[54] ACOUSTICALLY CONTROLLED FREQUENCY SHIFTED CAVITY FOR ELECTROMAGNETIC RADIATION

[75] Inventor: Larry Hess, Gaithersburg, Md.

[73] Assignee: Chevron Research Company, San Francisco, Calif.

[21] Appl. No.: 544,171

[22] Filed: Oct. 21, 1983

[51] Int. Cl.[4] .................................................. H01S 3/10
[52] U.S. Cl. .................................... 372/28; 372/13; 372/20; 372/94; 350/358
[58] Field of Search .................. 372/20, 13, 26, 27, 372/94, 28; 350/358; 356/350; 250/199

[56] References Cited

U.S. PATENT DOCUMENTS

| | | | |
|---|---|---|---|
| 3,422,370 | 7/1964 | Collins, Jr. | 331/94.5 |
| 3,544,795 | 12/1970 | Korpel | 350/358 |
| 3,551,690 | 12/1970 | Korpel | 307/88.3 |
| 3,821,548 | 6/1974 | Jernigan | 350/358 |
| 3,834,790 | 9/1974 | Macken | 350/157 |
| 4,000,939 | 1/1977 | McNaney | 350/358 |
| 4,013,365 | 6/1975 | Vali et al. | 356/106 LR |
| 4,131,792 | 12/1978 | Schlossberg | 250/199 |
| 4,217,036 | 8/1980 | Chang | 372/26 |
| 4,250,474 | 2/1981 | Joseph | 333/196 |
| 4,265,517 | 5/1981 | Blair et al. | 350/358 |
| 4,272,158 | 6/1981 | Johnston, Jr. et al. | 350/375 |
| 4,429,393 | 1/1984 | Guiliano | 372/21 |
| 4,443,066 | 4/1984 | Freyre | 350/358 |

FOREIGN PATENT DOCUMENTS

| | | |
|---|---|---|
| 1356035 | 8/1971 | United Kingdom . |
| 1587992 | 5/1978 | United Kingdom . |
| 2012472 | 1/1979 | United Kingdom . |
| 2017392 | 3/1979 | United Kingdom . |
| 2089105 | 8/1981 | United Kingdom . |

OTHER PUBLICATIONS

"Interaction Between Light and Sound", by Robert Adler—IEEE Spectrum (May 1967).

Primary Examiner—Léon Scott, Jr.
Attorney, Agent, or Firm—S. R. LaPaglia; E. J. Keeling; A. Stephen Zavell

[57] ABSTRACT

A frequency shifted cavity apparatus for electromagnetic radiation. The cavity filters electromagnetic radiation wherein the instantaneous frequency increases and changes non-linearly in time. The cavity can optionally include an optical amplifier with sufficient gain to cause oscillation of at least one cavity mode.

27 Claims, 5 Drawing Figures

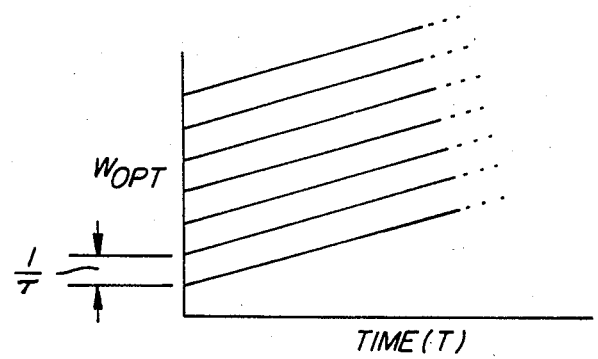
FIG._1A.
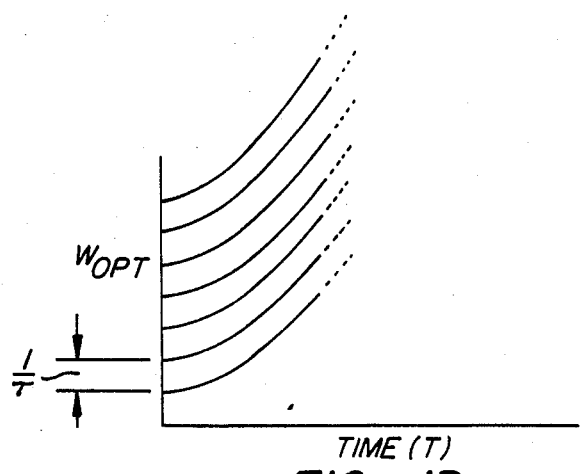
FIG._1B.
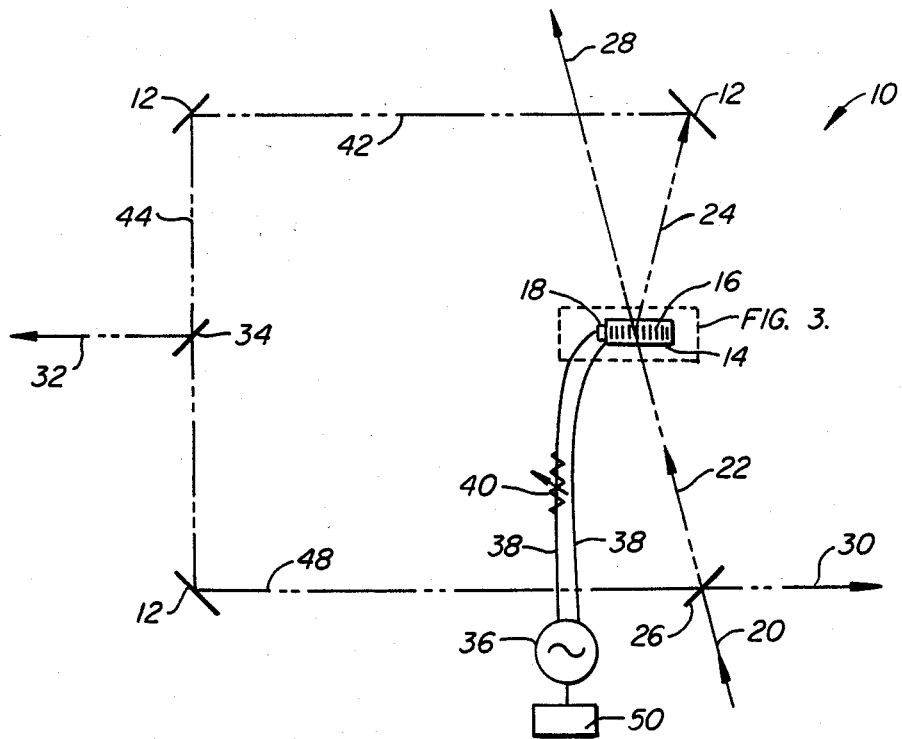
FIG._2.

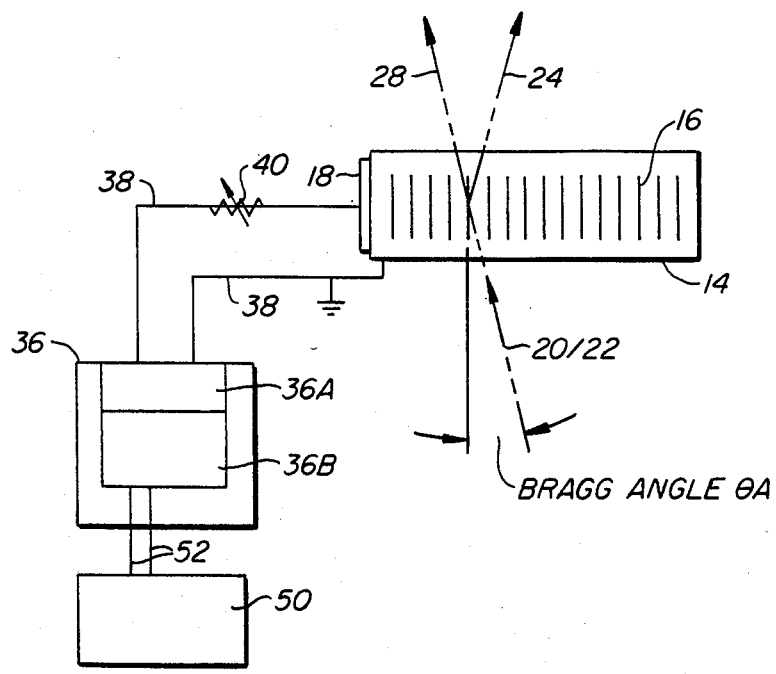
FIG._3.
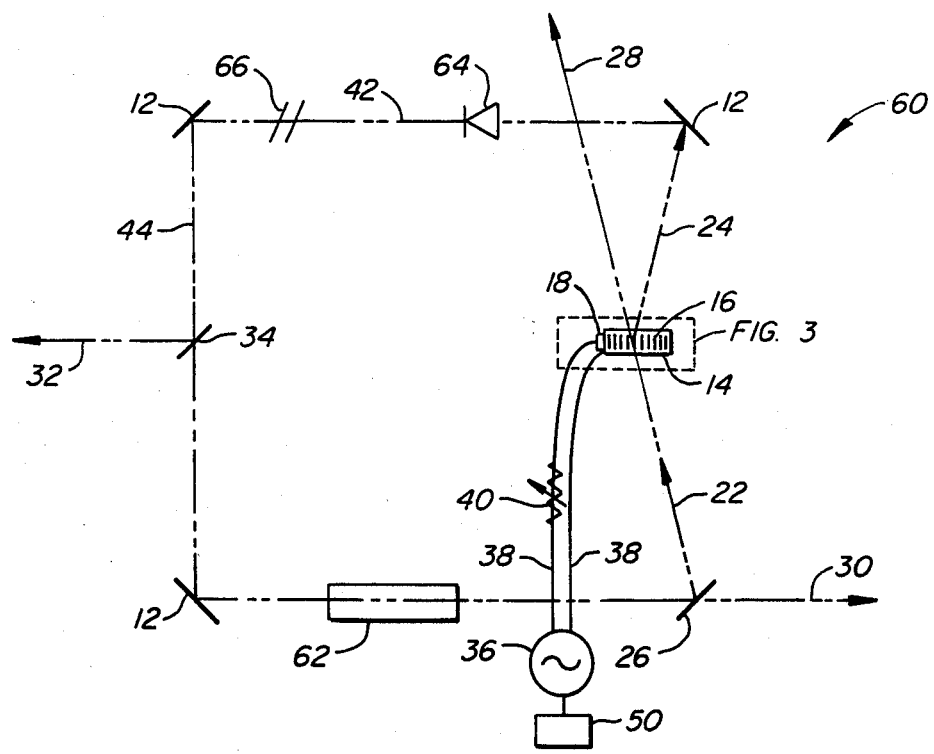
FIG._4.

ACOUSTICALLY CONTROLLED FREQUENCY SHIFTED CAVITY FOR ELECTROMAGNETIC RADIATION

FIELD OF THE INVENTION

The invention relates to the field of optical amplifiers and electromagnetic radiation cavity filters. More specifically, this invention relates to an acoustically controlled frequency shifted cavity for electromagnetic radiation and a scanning laser.

BACKGROUND OF THE INVENTION

The prior art uses optical cavities to filter electromagnetic radiation. Optical cavities are also used in conjunction with optical amplifiers to generate coherent radiation. More specifically, ring-type optical cavity filters can filter and generate radiation whose instantaneous frequency is changing in time. Changing the optical path length of the cavity causes the resonant modes of the cavity to shift in frequency at the same time rate as the desired frequency shift rate of the radiation to be filtered or generated. The optical path length of a cavity is changed with electro-optic devices such as rotating brewster plates as in the Model #699-05 ring cavity laser produced by Coherent Corp. or by electro-optic crystal devices such as the Series #620 phase/frequency modulators produced by Interactive Radiation, Inc. in Northvale, N.J. The optical path length of a cavity may also be changed by mechanically or piezoelectrically moving one of the mirrors which form the cavity. Electro-optic devices are currently not capable of causing path length changes of more than about 0.01% in a typical cavity. The mechanical and piezoelectric means are difficult to construct with sufficient precision for causing a cavity path length change corresponding to a frequency shift of more than approximately 100 resonant mode spacings for a one-meter long cavity. Further, shifting the frequency of the resonant modes of a cavity by changing the cavity length also changes the difference in frequency between two different modes.

In U.S. Ser. 370,434, filed Apr. 21, 1982 and completely incorporated herein by reference, a frequency shifted cavity was described whose stationary mode solutions actually have instantaneous frequencies which change in time. This cavity eliminated the need for changing the optical path length within the cavity and also eliminated the change in the difference in frequency between two different resonant modes. In the preferred cavity and laser described therein, the time rate at which the instantaneous frequency changed is determined by the frequency of an acoustic wave within an electromagnetic wave frequency shifter. The frequency shifted cavity for electromagnetic radiation is useful in the construction of optical amplifiers, electromagnetic wave cavity filters, scanning lasers and other electro-optic devices.

As the frequency of the electromagnetic radiation is filtered and/or scanned, it eventually moves outside the Bragg condition of the frequency shifter acousto-optic cell in the cavity. It would be highly desirable to have an apparatus and a method for extending the frequency range over which the Bragg condition is maintained, thus extending the filter range of the cavity and scan range of the laser. It would also be desirable to have a filter and laser whose frequency shift increases non-linearly with time.

SUMMARY OF THE INVENTION

I have invented a frequency shifted cavity whose stationary mode solutions have instantaneous frequencies which change non-linearly in time. When the cavity incorporates an optical amplifier positioned to impart sufficient gain to the electromagnetic radiation from the electromagnetic radiation frequency shifting means to cause oscillation of a cavity mode, the frequency of the coherent radiation emitted by the cavity has a frequency which increases non-linearly with time over the scan range of the apparatus. The invention further provides for an increased frequency range over which the electromagnetic radiation can be filtered or amplified while remaining in the Bragg condition of an acousto-optic Bragg cell frequency shifting means. In other words, the capability of beamsteering with the Bragg cell is accomplished by varying the periodicity of an acoustic wave within the Bragg cell as opposed to the phase modulation of a pair of electrodes attached to the Bragg cell. The spectrum of electromagnetic radiation over which my invention is operable is limited only by the components incorporated therein. Improvements in the components would expand the range of electromagnetic radiation capable of being filtered and/or generated by my invention. In addition, these and other objects, features, embodiments and advantages of the invention will be understood from the following description of preferred embodiments.

BRIEF DESCRIPTION OF THE DRAWINGS

FIG. 1A represents the optical frequency, $\omega_{opt}$, as a function of time, T, for some resonant modes of an optical cavity designed in accordance with the teachings of U.S. Pat. No. 370,434.

FIG. 1B represents the optical frequency, $\omega_{opt}$, as a function of time for some resonant modes of the optical cavities formed by the present invention.

FIG. 2 is a schematic representation of an embodiment of the invention.

FIG. 3 illustrates the acousto-optic device of FIG. 2 in more detail.

FIG. 4 is a schematic representation of the invention further including an optical amplifier, an etalon, and an optical diode.

DETAILED DESCRIPTION

The invention comprises an electromagnetic wave frequency shifter such as an acousto-optic Bragg cell and an optical cavity defined by devices which direct electromagnetic waves, e.g. mirrors, folding prisms, optical fibers, and the like. The cavity is geometrically configured such that when a diffraction limited beam of electromagnetic radiation, hereafter beam I, is directed to said shifter; a portion of the radiation from beam I which emerges from said shifter, hereafter called beam II, and having its frequency shifted by an amount w radians per second is also eventually directed to said shifter essentially along the same geometric path as beam I and having the same polarization as beam I. Likewise beam II will have a portion shifted and directed along the same geometric path.

The utility of the invention can be understood by considering it to form a resonant cavity for electromagnetic waves, the cavity being the geometric space occupied by beam II. The cavities of my invention thus formed will have a discrete set of modes or solutions whose electric or magnetic field components can be approximately represented EQ 1 below:

$$F_m(t,\chi) = B\exp[-i\theta]  \quad \text{Eq. 1}$$

wherein $$\theta(t,\chi) = \omega_o(t - \chi/c) + \frac{G\omega_o}{2\tau(1+G)}(t-\chi/c)^2 + \frac{G^2\omega_o}{6\tau^2(1+G)^2}(t-\chi/c)^3 \quad \text{Eq. 1a}$$

$\theta(t,\chi)$ is the optical phase of the laser mode
B is the amplitude of the field
t is the time
c is the speed of light in vacuo
$\chi$ is the optical path length to the point at which $\theta(t,\chi)$ is being evaluated. It may be measured along beam II starting from the intersection of the geometric extension of beam I and beam II. $\chi$ is positive when measured in the direction of propagation of beam II and negative in the opposite direction.

$\omega_o$ is the optical frequency at zero time and zero optical path.

$\tau$ is the transit time for light to make one round trip of the cavity along the path of beam II. It equals L/C (L is the total optical path as measured along beam II for one round trip in the cavity.) It is always positive.

$$G \equiv 2\frac{nv}{c}\sin\theta(t,\chi)$$

where n is the refractive index of the material comprising the acousto-optic cell, $v$ is the velocity of sound in that medium and $\equiv$ means equal by definition.

The modes represented by $\theta(t,\chi)$ have a frequency which changes non-linearly with time and non-linearly along the optical path length. The non-linear rate of change in $\theta$ is approximately expressed in the time derivative:

$$\frac{\partial\theta}{\partial t} = \omega_o + \frac{G\omega_o}{\tau(1+G)}(t-\chi/c) + \frac{G^2\omega_o}{2\tau^2(1+G)^2}(t-\chi/c)^2 \quad \text{Eq. 2}$$

where $\partial\theta/\partial t$ is the instantaneous angular frequency denoted by $\omega(t,\chi)$ or simply $\omega_{opt}$ and can be expressed in radians per second.

The acoustic phase shift is given by $$\Delta\theta_a = \theta(t,o) - \theta(t,L).$$

By substitution and differentiation the acoustic frequency is given by $$\omega_a(t) = \frac{d}{dt}\Delta\theta_a(t) = \frac{G\omega_o}{1+G} + \frac{G^2\omega_o}{\tau(1+G)^2}t - \frac{G^2\omega_o}{2(1+G)^2} \quad \text{Eq. 3}$$

and indicates what the acoustic frequency has to be at every point in order that the Bragg condition be met at every point in the scan.

The principal feature of the present invention which distinguishes it from U.S. application Ser. No. 370,434 is contained within a consideration of $\omega_{opt}$. FIG. 1A illustrates the variation of $\omega_{opt}$ with time for some resonant modes at some stationary geometric point within a resonant cavity designed according to U.S. Ser. No. 370,434.

In FIG. 1A $\omega_{opt}$ linearly increases in time for each resonant mode of the cavity as represented by the sloped lines. The time variation of $\omega_{opt}$ for a particular value of x, for the resonant modes produced by my invention, is displayed in FIG. 1B. The significant feature is that, for each mode, $\omega_{opt}$ increases non-linearly as time increases. Additionally, it is to be noted that for specific values of x and T, the difference in angular frequency between adjacent modes is, for each case:

$1/\tau$ which, disregarding material dispersion, is constant.

The invention can be used to filter electromagnetic radiation by directing an input beam of electromagnetic radiation to be filtered essentially along the path of beam I. For example, an embodiment of the invention as a frequency shifted cavity is illustrated as 10 in FIG. 2 and FIG. 3. In FIG. 2, the electromagnetic radiation directing devices 12 and 26, such as completely or partially reflecting mirrors, form the cavity 10. Suitable mirrors are available from Spectra Physics, Laser Instrument Division, Montainview, CA. A frequency shifter means 14, for example, an acousto-optic Bragg cell is also within the cavity. The terms acousto-optic Bragg cell and Bragg cell, as used herein, are synonyms. A suitable Bragg cell is a model H-211, a product of the Harris Corporation, Melbourne, Fla. or a model ADM-40, a product of the IntraAction Corp. of Bellwood, Ill. The acoustic wave 16 in the Bragg cell 14. A transducer 18 on the Bragg cell 14 permits the acoustic waves 16 to be varied. The input beam 20, i.e., beam I, of electromagnetic radiation to be filtered, enters the cavity through the partially reflecting mirror 26. The optical path of an input beam I which has been around the cavity and through the frequency shifter means and shifted and a new input beam I injected into the cavity is denoted as beam 22, i.e., beam II after shifting. The path of radiation emerging from a non-zero diffraction order of the Bragg cell 14 is illustrated as 24. The path of that portion of radiation which emerges from the Bragg cell in the zero diffraction order is illustrated as 28. The optical path of the beam within the cavity formed by the radiation directing means 12 and 26 is illustrated by 42, 44 and 48. If desirable, an optional output coupler 34, such as partially reflecting mirror can be positioned to extract a portion of the frequency shifted beam within the cavity 10.

The controls for the frequency shifter are illustrated in more detail in FIG. 3. The electronic alternating current power supply 36 for the transducer 18 of Bragg cell 14 is connected by electrical conductors 38. An optional variable resistor 40 electronically in series with power supply 36 and transducer 18 can be used to vary the intensity of the acoustic wave. The power supply 36 includes the amplifier 36A and a voltage control oscillator 36B. A suitable voltage control oscillator is an IntraAction Corp., Bellwood, Ill., model DE-40 or a DE-40 MR. Connected to the voltage control oscillator 36B portion of the power supply 36 through wires 52 is a waveform generator 50, such as a Hewlett-Packard HP-3114A waveform generator. The waveform generator 50 provides a voltage ramp input to the power supply 36. The voltage ramp input creates a frequency ramp output from the acousto-optic Bragg cell. This creates the non-linear type of scan illustrated in FIG. 1B. The voltage ramp is adjusted to take into account the limitations of the components of the system and to maintain the Bragg condition over the broadest possible spectrum of the electromagnetic radiation. In U.S. Ser. No. 370,434, the power supply 36 was operated at a constant voltage without the waveform generator 50 and thus produced the scan illustrated in FIG. 1A.

As the beam travels around the cavity 10 and is shifted by the Bragg cell 14, the necessary conditions to maintain the Bragg angle changes. The change in the Bragg angle (diffraction angle) is provided by:

$$\sin \theta = \frac{c \, \omega_{AO} nm}{2 \, v \, \omega_{opt}}$$

where
m = diffraction order
$\omega_{AO}$ = frequency of the acoustic wave in the acousto-optic cell
$\omega_{opt}$, c, n and $v$ are as defined previously in Equations 1 and 2.
$\theta$ = Bragg angle This is indicated as $\theta$A in FIG. 3. Clearly, as the optical frequency $\omega_{opt}$ is scanned, the Bragg angle $\theta$ will change. The acoustic frequency, $\omega_{AO}$ (given by Eq. 3) can be scanned in such a way that the Bragg angle is held constant while the optical wavelength is scanned. The optical scan will no longer be linear. This is an improved and alternative technique to beamsteering described in U.S. Ser. No. 370,434. Ramping the voltage input to the Bragg cell permits the frequency within the Bragg cell to change. Thus, the range over which the Bragg condition is maintained is increased. Of course, the intensity of the frequency can be adjusted by resistor 40. More particularly, this technique may be implemented by using commercially available Bragg cells such as model AOM-40 or ADM-40 produced by Intra Action Corp., Bellwood, Ill. The Bragg cells are driven a model DE-40R acoustic frequency shifter. This device permits the changing of the acoustic frequency within the Bragg cell by controlling the applied voltage to a voltage control oscillator. A voltage ramp into the device produces a frequency ramp change within the Bragg cell. The applied voltage can be adjusted so as to maintain any desired frequency change in the Bragg cell. If necessary, the polarization of the electromagnetic radiation can be adjusted with devices such as Soleil Babinet compensators, products of the Karl Lambrecht Corp., Chicago, Ill., or wave plates, and the like.

In this embodiment, the transmitted output beam from the filter 10 is the radiation along path 28 which is that portion of the radiation from beam I and beam II which emerges from the Bragg cell 14 in the zero diffraction order. The Bragg cell 14 may therefore serve as the output coupler. Alternatively, the transmitted output can be a beam extracted from beam II anywhere inside the cavity. For example, the transmitted output could be beam 32 in FIG. 2 which is extracted from the cavity by partially reflecting mirror 34 which serves as the output coupler. Alternatively, the output could be beam 30 which is from partially reflecting mirror 26 and is the reflected or rejected radiation from the filter 10.

The invention allows that the intensity of the acoustic wave 16 may be varied so as to vary the portion of the radiation from beam I and beam II which emerges from the Bragg cell 14 in the zero diffraction order. Since radiation which merges in the zero order is output from the cavity, varying the acoustic intensity will have the effect of varying the "Q" or "quality factor" of the cavity.

Frequency shifters other than a Bragg cell may be employed in this invention. However, the term, frequency shifter, excludes those devices, which when inserted into the cavity, cause the resonant mode frequencies to shift by altering the total optical path length of the cavity. This is because those said devices also will change the difference in optical frequency between resonant modes.

The invention can be used to filter the output of a scanning dye laser. In such cases the filter will tend to only transmit that laser light which is scanning at the proper rate and has an instantaneous angular frequency corresponding to the instantaneous angular frequency of one of the invention's modes. This is similar to the operation of a normal multi-pass filter except that the invention's modes have angular frequencies which change in time whereas the frequencies of the modes of a normal cavity are constant in time. When a normal cavity is used to filter light from a scanning laser, the optical path length within the cavity must be changed. This is normally accomplished using mechanical systems which are difficult to construct to the necessary precision. The present invention eliminates the need for such mechanical systems.

The invention also provides for several alternative embodiments, wherein an optical amplifier is within the cavity. FIG. 4 illustrates a frequency shifted cavity which incorporates an optical amplifier 62 wherein the combination forms a frequency shifted scanning laser 60. In FIG. 4, all the components are the same with the exception of the optical amplifier 62 and the optical diode 64 and etalon 66. These individual devices can be used in any combination in a cavity configuration. For example, only the optical amplifier could be used in cavity 10 or 60.

If the gain of the optical amplifier 62 is sufficiently high to overcome the optical losses in the cavity from the cavity components, i.e., Bragg cell, mirrors, etc., then oscillation will occur similar to that which occurs in commercially available lasers. However, instead of the oscillation occurring in modes of constant frequency, as in commercial lasers, the oscillation in the invention occurs in the modes described in Equation 1. The output from the oscillating cavity can be along the same paths as for the non-oscillating cavity. The output beam of the cavity during oscillation will be a mode or modes, the frequency of which changes in non-linearly time. In cases when two or more modes are oscillating, the difference in optical frequency between three oscillating modes remains constant. An example of an optical amplifier 62 may be a dye jet as is used in the dye laser #699-05 manufactured by Coherent Inc., Palo Alto, CA. The dye may be LD700 which is available from Exciton Chemical Company, Dayton, OH. The dye is dissolved in ethylene glycol or other suitable solvents. The dye may be optically pumped with a model #3000K krypton laser, a product of Coherent Inc. The krypton laser should be adjusted to operate at 647 nanometers. An alternative optical amplifier is a GaAs laser. Some of the mirrors 12 may have curved surfaces to focus the energy distribution of the modes to the pumped region of the dye jet and/or to reduce cavity diffraction losses as for cavities of the prior art.

An additional example of a suitable Bragg cell 14 is a model 1205 modulator manufactured by Isomet Corporation, Springfield, VA. An amplifier of course may be placed within other forms of the cavity such as embodiments illustrated in U.S. Pat. No. 370,434.

The time rate at which the angular frequency of the output of the invention changes is the same as that rate for the modes. This rate is determined by the acoustic frequency through Equation 4.

$$\frac{\partial^2 \theta}{\partial t^2} = \frac{G \omega_o}{\tau(1 + G)} - \frac{G^2 \omega_o}{\tau^2(1 + c)^2} (t - \chi/c) \quad \text{Eq. 4}$$

This means that the instantaneous angular frequency of the output for each oscillating mode would change at a non-linear rate determined by the acoustic frequency. The acoustic frequency changes in a manner approximated by Eq. 3, such that for every optical frequency $\omega_{opt}$ the acoustic frequency $\omega AO$ is such that the Bragg condition is satisfied. To accomplish this, the acoustic frequency must change at a rate given by $$\frac{d^2 \Delta \theta}{dt} = \frac{G^2 \omega o}{\tau(1 + G)^2} \quad \text{Eq. 5}$$

Obviously, the oscillation for any mode cannot continue indefinitely since the optical frequency would eventually fall outside of the spectral range of the gain of the optical amplifier. Were this to happen, mode hopping would result, e.g. as a particular oscillating mode proceeds outside of the spectral range of the gain of the optical amplifier the cavity will begin to oscillate at another mode, the frequency of which enters the spectral range of the amplifier.

However, this range can be expanded by changing the frequency within the Bragg cell.

In alternative embodiments, one or more wavelength filters are inserted into the cavity. A wavelength filter may be, for example, a common Fabry-Perot etalon, 66. Suitable etalons are available from Burleigh Instruments, Inc., Fishers, N.Y. The purpose of the wavelength filter is to restrict the number of oscillating cavity modes. For example, with the addition of an etalon, the only cavity modes which can oscillate are those which have an instantaneous angular frequency which is at or very near a spectral transmission peak of the etalon. Since the cavity modes have angular frequencies which change in time, it will be necessary to scan the transmission peaks of the etalon so they will follow the frequencies of the cavity modes if the oscillating cavity modes are to remain in oscillation. The etalon 66 may be scanned in either of the manners used for scanning the intracavity etalons in the Coherent, Inc. model #699-05 dye laser, e.g., the separation between the etalon mirrors may be changed by using a piezoelectric material to move one of the etalon mirrors with respect to the other or the etalon itself can be tilted.

The addition of the waveform generator permits the spectral center of the Bragg spectral region to be varied by changing the acoustic frequency. This is analogous to beamsteering. The effect achieved allows the acoustic frequency to be changed while keeping the input radiation within the Bragg spectral region for an essentially constant input optical frequency. The present invention, however, uses a change in the acoustic frequency within the Bragg cell to maintain the optical frequency of the input radiation within the Bragg spectral region. This is accomplished by changing the frequency of the acoustic wave through a change in the voltage applied to the voltage control oscillator. This causes a change in the wavefront of the acoustic wave. The amount of change is determined by the magnitude of the frequency change. By varying the frequency, the spectral location of the Bragg spectral region can be changed for a particular geometrical path of input radiation. The acoustic Bragg cell can therefore be used as a wavelength filter within he cavity and the frequency change can be used to adjust the spectral location of this so-formed wavelength filter.

In addition, beamsteering as described in U.S. Ser. No. 370,434 can also be used in conjunction with changing the acoustic frequency on the Bragg cell to cause the Bragg spectral region to be spectrally coincident, i.e. track the instantaneous optical frequency of one or more cavity modes and to suppress one or more other cavity modes.

If the optical frequency of the input beam 20/22 changes, as will occur for radiation in the modes described by Equation 1, then the Bragg angle will change. But, if the acoustic frequency is changed in the self-consistent manner which tracks the optical frequency, then the Bragg angle will be maintained.

In another preferred embodiment, an optical diode 64 can be inserted into the frequency shifted cavity. The diode uses the Faraday effect in such a manner as to suppress cavity oscillation in one direction. As an example, the diode 64 may be inserted into cavity 60 as shown in FIG. 4 to suppress modes that are traveling in the clockwise direction in FIG. 4. Suitable optical diodes are available from Coherent Inc., Palo Alto, CA. Of course the optical diode 64 can be inserted into the cavity to suppress the oscillation in the opposite direction. In either case, the use of an optical diode will cause the laser of the invention to have only one output beam. The addition of the diode will also reduce or eliminate standing optical waves within the optical amplifier. As is known in the art, standing waves in the amplifier can cause modal instabilities within the cavity as well as reducing the effective gain of the amplifier. Presently available optical diodes function only for finite ranges of optical frequencies and therefore, a diode should be selected which has an optical range which has about the same spectral location as the gain of the optical amplifier.

The embodiment of the invention which includes an optical amplifier capable of achieving oscillation within the cavity, i.e., laser 60, will have an optical output whose instantaneous frequency will change non-linearly in time. This embodiment of the invention can be used to replace commercially available scanning output lasers, such as the Coherent Inc. model #699-05 dye laser. If desired, the orientation of the Bragg cell can be changed as taught in U.S. Pat. No. 370,434 to change the output coupling of the Laser 60.

The invention can have configuration other than that illustrated in FIGS. 2 and 4 described herein. Suitable examples of alternative configurations for the cavity are illustrated in FIGS. 4, 5, 6 and 10 in U.S. Ser. No. 370,434.

My invention has been described in detail with particular reference to preferred embodiments thereof, but it will be understood that variations and modifications can be affected within the spirit and scope of the invention.

What is claimed is:

1. An electromagnetic radiation frequency shifting apparatus comprising:
   (a) electromagnetic radiation directing means for directing radiation in a preferred optical cavity configuration;
   (b) electromagnetic radiation frequency shifter means for shifting electromagnetic radiation positioned in said predetermined optical cavity configuration so that when a diffraction limited beam of electromagnetic radiation is directed to said electromagnetic radiation frequency shifter means, a portion of radiation from said diffraction limited beam of electromagnetic radiation which emerges from said electromagnetic radiation shifter means, having its frequency shifted, is also directed to said electromagnetic radiation frequency shifter means by said electromagnetic radiation directing means along essentially the same predetermined optical cavity configuration and in essentially the same direction as said diffraction limited beam of electromagnetic radiation so as to have essentially the same polarization as said diffraction limited beam of electromagnetic radiation; and
   (c) frequency varying means for changing the acoustic frequency within the electromagnetic frequency shifter means.

2. The apparatus according to claim 1 wherein said electromagnetic radiation directing means define an optical cavity wherein the geometric configuration of the cavity has a discrete set of modes approximately represented by:

$$F(t,\chi) = B\exp\left\{-i\left[\omega_o + \frac{G\omega_o}{\tau(1+G)}(t - \chi/c) + \frac{G^2\omega_o}{2(1+G)\tau^2}(t - \chi/c)^2\right]\right\}$$

wherein B is the amplitude of the field, T is the time, c is the speed of light in a vacuum; $\chi$ is the optical path length to the point at which $\theta(t,\chi)$ is being evaluated, wherein $\chi$ is positive when measured in the direction of propagation of a beam II and negative when measured in the direction opposite thereto; $\tau$ is the amount of time taken for the electromagnetic radiation to make one round trip of the cavity along the path of said beam II, wherein $\tau$ equals L/C; L is the total optical path length as measured along said beam II for one round trip of said predetermined optical cavity configuration; $\omega_o$ is the optical frequency at time zero and zero optical path; G is equal by definition to $2(n\nu/c \sin\theta(t,\chi))$ where n is the refractive index of the material comprising the acousto-optic cell and $\nu$ is the velocity of sound in said material; and exp is an abbreviation which indicates that the quantity immediately following in brackets is to be considered as the exponent of e.

3. The apparatus according to claim 1 wherein the electromagnetic radiation directing means is selected from the group consisting of mirrors, folding prisms, optical fibers, or combinations thereof.

4. The apparatus according to claim 3 wherein said electromagnetic radiation frequency shifter means is an acoustic-optic Bragg cell incorporating said frequency varying means.

5. The apparatus according to claim 4 wherein said frequency varying means is a waveform generator.

6. The apparatus according to claim 5 further comprising means for adjusting the degree of output coupling by said Bragg cell.

7. The apparatus according to claim 6, further comprising beamsteering means for maintaining the input beam within the spectral region of Bragg cell.

8. The apparatus according to claim 7 further comprising an optical amplifier positioned in the path of the electromagnetic radiation, said optical amplifier selected to have sufficient optical gain to cause oscillation of a cavity mode.

9. The apparatus according to claim 8 further comprising an etalon placed within the formed optical cavity to suppress the excitation of at least one cavity mode.

10. The apparatus according to claim 9 further comprising a second Bragg cell located within the path of electromagnetic radiation and positioned to compensate for the change in the non-zero diffraction order deflection angle resulting from a change in the frequency of the acoustic wave within said acousto-optic Bragg cell.

11. The apparatus according to claim 10 further comprising an optical diode in the path of the electromagnetic radiation.

12. The apparatus according to claim 1 further comprising an output coupling means and an optical amplifier so positioned in the path of the electro-magnetic radiation and so selected to have sufficient optical gain or within cavity to cause oscillation of a cavity mode.

13. The apparatus according to claim 1 wherein said frequency shifter means is an acousto-optic Bragg cell.

14. An apparatus for generating electromagnetic radiation comprising:
   (a) electromagnetic radiation directing means for directing radiation in a ring cavity configuration;
   (b) an acousto-optic Bragg cell positioned in said ring cavity configuration so that when a diffraction limited beam of electromagnetic radiation is directed to said Bragg cell, a portion of said radiation emerging from said Bragg cell in a non-zero diffraction order and having its frequency shifted, is also directed to said Bragg cell by said electromagnetic radiation directing means along essentially the same path and in essentially the same direction as said diffraction limited beam of electromagnetic radiation so as to have essentially the same polarization as diffraction limited beam of electromagnetic radiation;
   (c) frequency varying means for varying the acoustic frequency within the acousto-optic Bragg cell; and
   (d) an optical amplifier positioned in said ring cavity configuration to impart sufficient optical gain to said portion of said electromagnetic radiation to cause oscillation of a cavity mode.

15. The apparatus according to claim 14 wherein said electromagnetic radiation directing means comprise at least two mirrors.

16. The apparatus according to claim 15 wherein said frequency varying means is a waveform generator connected to the power supply of a transducer connected to the acousto-optic Bragg cell.

17. The apparatus according to claim 16 further comprising at least one etalon in said ring cavity configuration to suppress the excitation of at least one cavity mode.

18. The apparatus according to claim 17 further comprising an optical diode in said right cavity configuration to suppress the oscillation of cavity modes having radiation traveling in one of the directions within said ring cavity configuration.

19. The apparatus according to claim 18, further comprising means for adjusting the degree of the output coupling of said Bragg cell.

20. A method of generating electromagnetic radiation comprising:
 (a) directing electromagnetic radiation in a predetermined ring cavity configuration;
 (b) shifting the frequency of a portion of said beam of electromagnetic radiation, said shifting occurring through a variation in an acoustic frequency applied to said electromagnetic radiation;
 (c) directing said frequency shifted portion of said beam of electromagnetic radiation along essentially the same ring cavity configuration and in essentially the same polarization as said beam of electromagnetic radiation; and
 (d) amplifying the shifted portion of said electromagnetic radiation in said ring cavity configuration to cause oscillation of a cavity mode.

21. The method according to claim 20 wherein a portion of the electromagnetic radiation is shifted by an acousto-optic Bragg cell having an acoustic frequency shifting means connected thereto.

22. The method according to claim 21 further comprising adjusting the output portion of the electromagnetic radiation from said ring cavity configuration with said Bragg cell.

23. The method according to claim 22 wherein adjusting the output portion of the Bragg cell adjusts the intensity of the acoustic wave within the Bragg cell.

24. The method according to claim 23 further comprising suppressing the excitation of at least one cavity mode.

25. The method according to claim 24 further comprising adjusting for the change in the non-zero diffraction order deflection angle resulting from a change in the frequency of the acoustic wave within the Bragg cell.

26. The method according to claim 25 further comprising beamsteering the acousto-wave within said Bragg cell.

27. The method according to claim 26 further comprising suppressing the cavity modes having radiation traveling in one of the directions within said ring cavity configuration.

* * * * *

UNITED STATES PATENT AND TRADEMARK OFFICE
CERTIFICATE OF CORRECTION

PATENT NO. : 4,586,184

DATED : April 29, 1986

INVENTOR(S) : LARRY HESS

It is certified that error appears in the above–identified patent and that said Letters Patent are hereby corrected as shown below:

In the Claims:

Claim 1 , Line 4, "in a preferred optical cavity", should read --in a predetermined optical cavity--.

Claim 18, Line 2, "right" should read --ring--.

Signed and Sealed this

Sixteenth Day of December, 1986

Attest:

DONALD J. QUIGG

Attesting Officer    Commissioner of Patents and Trademarks